United States Patent
O Loughlin et al.

(10) Patent No.: US 6,407,375 B1
(45) Date of Patent: Jun. 18, 2002

(54) DEVICE MONITOR FOR MULTIPLE OPTICAL SIGNALS

(75) Inventors: Mark E. O Loughlin, Galloway; Craig T. Walters; Patrick M. Kenney, both of Powell; Steven M. Toller; Jeff L. Dulaney, both of Dublin, all of OH (US)

(73) Assignee: LSP Technologies, Inc., Dublin, OH (US)

( * ) Notice: Subject to any disclaimer, the term of this patent is extended or adjusted under 35 U.S.C. 154(b) by 0 days.

(21) Appl. No.: 09/353,674

(22) Filed: Jul. 15, 1999

(51) Int. Cl.[7] .................................................. G01J 1/04
(52) U.S. Cl. ............... 250/227.11; 250/216; 356/237.1; 356/239.1; 219/121.61
(58) Field of Search ......................... 250/216, 227.11, 250/227.2, 227.27; 356/124, 239.1, 239.2, 239.7, 237.1; 372/25, 38.1, 38.01, 38.02, 38.03, 38.04, 38.05, 38.06, 38.07, 38.08, 38.09; 219/121.61, 121.62, 121.82, 121.83; 606/2, 12, 15, 16

(56) References Cited

U.S. PATENT DOCUMENTS

| | | | | |
|---|---|---|---|---|
| 3,806,829 A | * | 4/1974 | Duston et al. | ........... 372/38.01 |
| 4,311,142 A | * | 1/1982 | Machida | ........................ 606/12 |
| 4,423,726 A | * | 1/1984 | Imagawa et al. | ............... 606/2 |
| H376 H | | 12/1987 | Bremer | |
| 5,159,402 A | | 10/1992 | Ortiz, Jr. | |
| 6,046,802 A | * | 4/2000 | Ortiz, Jr. | .................. 356/237.1 |

* cited by examiner

Primary Examiner—Stephone Allen
(74) Attorney, Agent, or Firm—Randall J. Knuth (57) ABSTRACT

A monitor of a plurality of optical signals utilizing fiber optics which form an array. An image of the array is captured and the captured image is processed for detecting a quality of an optical signal such as the presence, absence, intensity, wavelength, or other quality of the optical signal. A method of monitoring a plurality of optical signals by capturing a plurality of optical signals from an array of signals and detecting a quality of at least one optical signal is also disclosed.

39 Claims, 8 Drawing Sheets

DEVICE MONITOR FOR MULTIPLE OPTICAL SIGNALS

This invention was made with United States Government support under Contract No. F33615-98-C-5150 awarded by the Department of the Air Force. The United States Government has certain rights to this invention.

BACKGROUND OF THE INVENTION

1. Field of the Invention

The present invention relates to a monitor for detecting a plurality of optical signals, and in particular, a monitor for laser shock processing that detects the absence, presence, or other quality of an optical signal from an array of optical signals.

2. Description of the Related Art

Lasers are composed of various optical components, and light and photon generating devices. Light is generated by various laser components such as flashlamps and the energized gain medium. Light can also be reflected, scattered, and/or transmitted from optical components such as lenses and mirrors. These various light sources produce optical signals.

Optical signals may be generated within a laser by various means. Photons from these optical signals may be detected. An optical signal could be generated by photons which directly reflect (i.e. specular reflection) off the surface of a laser component or workpiece being processed. In addition, an optical signal may be generated due to diffuse reflection (i.e. non-specular scattering of photons in all directions). An optical signal may also be generated by photons that "leak" through a mirror in which photons are transmitted through rather than being reflected by the mirror. Further, an optical signal may be generated by a portion of the laser beam hitting a non-optical surface, for example, a beam dump or energy meter.

Additionally, an optical signal may be generated by an electrical or magnetic signal, such as an LED or other light-emitting device. One light-emitting device which may be employed is a material that emits light at a wavelength other than the laser wavelength, such as known fluorescent materials. This light-emitting material may be an absorbing material (perhaps used as a beam dump) or a transmitting material, such as a doped optical material.

In order to monitor the presence of an optical signal, (i.e. light produced by a light generating source which includes light reflected, scattered, and/or transmitted by an optical component), traditional monitors use a photodiode or similar photo sensing device to detect the optical signal's presence. A separate photo sensing device is typically necessary for each optical signal. The detected optical signal is typically processed in the form of logging an optical signal's absence or presence.

One disadvantage with current optical signal detection is the necessity for a separate photo detector for each optical signal. The requirement of a separate photo detector for each optical signal results in an increase in complexity and cost associated with manufacturing, assembling and operating an optical signal monitor.

A second disadvantage of traditional optical signal detectors is the use of, for example, copper wire to electronically communicate the detected optical signal to a processor. Copper wire is susceptible to EMI (electromagnetic interference), and as a result, it is not recommended to use copper wire to communicate detected signals in applications where EMI may produce false signals to the processor. Therefore, some applications are not able to use optical signal monitors which utilize copper wire or electronic signals.

SUMMARY OF THE INVENTION

The present invention provides a monitor for multiple optical signals. The optical signals from various optical generators are combined together to form an array of optical signals. The array is imaged and the image is processed to detect the presence of the various optical signals.

The invention, in one form thereof, is an apparatus for monitoring a plurality of optical signals. At least one optical signal generator produces at least one of the plurality of optical signals. The apparatus includes fiber optics having at least one fiber, the fiber has a first end and a second end. The first end is operatively associated with one of the plurality of optical signals, and the second end terminates at an array. An optical sensor means is operatively associated with the array for generating an array signal. A processor means is operatively associated with the array signal for detecting a quality of the optical signals communicated through the fibers. In varying alternate embodiments, the optical signal generator is an optical reflection off of an optic such as a mirror, transmissive optical component, polarizer, or gain medium. In addition, the optical generator may be a flashlamp, amplified stimulated emission from gain medium, fluorescence from a gain medium, or a target backscattering event. In alternate embodiments, the quality of the optical signal detected is the absence or presence, intensity, or wavelength of the optical signal.

The invention, in a further, alternate embodiment thereof, includes a second fiber optic, a second optical sensor means, and a second processor means. The processor means and the second processor means generate a first processor signal and a second processor signal respectively. A central processor is operatively associated with the first processor signal and the second processor signal. The central processor generates a central processor signal.

The invention, in another form thereof, is a method of monitoring a plurality of optical signals. The method includes the steps of providing fiber optics which have an origin operatively associated with an optical signal generator and a termination forming an array. The plurality of optical signals are captured from the array to generate at least one captured signal. A quality of at least one of the plurality of optical signals from at least one captured signal is detected.

One advantage of the present invention is the ability to detect a plurality of optical signals simultaneously. An array of optical signals is imaged and the image is processed to detect the absence or presence of an optical signal.

A second advantage of the present invention is a decrease in the cost to implement this monitor over current optical signal detection systems. Traditional optical detectors use a separate photodiode or similar detector for each optical signal. As the number of optical signals increases, the costs associated with the numerous photodiodes and data collection equipment becomes prohibitively high. The present invention eliminates the need for a separate photodiode or other detector for each optical signal by imaging and processing an array of optical signals. Consequently, the costs, physical space, electrical connections, and digital data acquisition equipment associated with individual photodiodes are eliminated.

A third advantage of the present invention is the use of fiber optics rather than electrical wire, e.g. copper wire.

Since fiber optics are not susceptible to EMI, the present invention is suitable for employment in applications where electrical wire based monitors could not be employed.

A fourth advantage of the present invention is that the operation costs of a laser system implementing the invention should decrease since the laser operator will be monitoring the laser system in real-time rather than running separate diagnostics on the laser system.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

A laser system generates a beam of coherent energy. During the generation of a beam of coherent energy, light in the form of optical signals are both generated and reflected, scattered, and transmitted from laser optics and other components. To ensure proper operation of a laser system, it is often necessary to monitor various qualities of these optical signals. One such quality is the absence or presence of the optical signal. In addition, it is advantageous to discern various other qualities of the optical signal, such as intensity and wavelength.

Optical signals may be generated within a laser system by numerous means. An optical signal may be produced by direct (i.e. specular) reflection. In addition, diffuse (i.e. scattered or non-specular) reflections scatter photons in all directions. An optical signal may be produced when photons "leak" (i.e. are transmitted) through a mirror.

An optical signal may also be obtained when a laser beam hits a non-optical surface. For example, an optical signal is generated when a laser beam reflects off of a beam dump or energy meter. Scattered light may be emitted from the non-optical surface at a wavelength other than the laser wavelength.

An optical signal may also be generated by an electric or magnetic signal, such as an LED or other light-emitting device. For example, one light emitting device which may be employed is a material which emits light at a different wavelength than the laser beam. One such material type is fluorescent material. The light emitting material may be an absorbing material, such as a beam dump. Alternatively, the material could be a transmitting material such as a doped optical material.

The present invention is directed at detecting these various optical signals. In detecting these optical signals, it may be necessary to use optical attenuation in front of an optical detector to decrease the intensity of the optical signal. The use of optical attenuation is commonly necessary when detecting an optical signal from a direct reflection, diffuse reflection, and transmittance signals. The detection of scattered light off of a non-optical surface may reduce or eliminate the need for optical attenuation in front of the optical detector.

Figure 1:
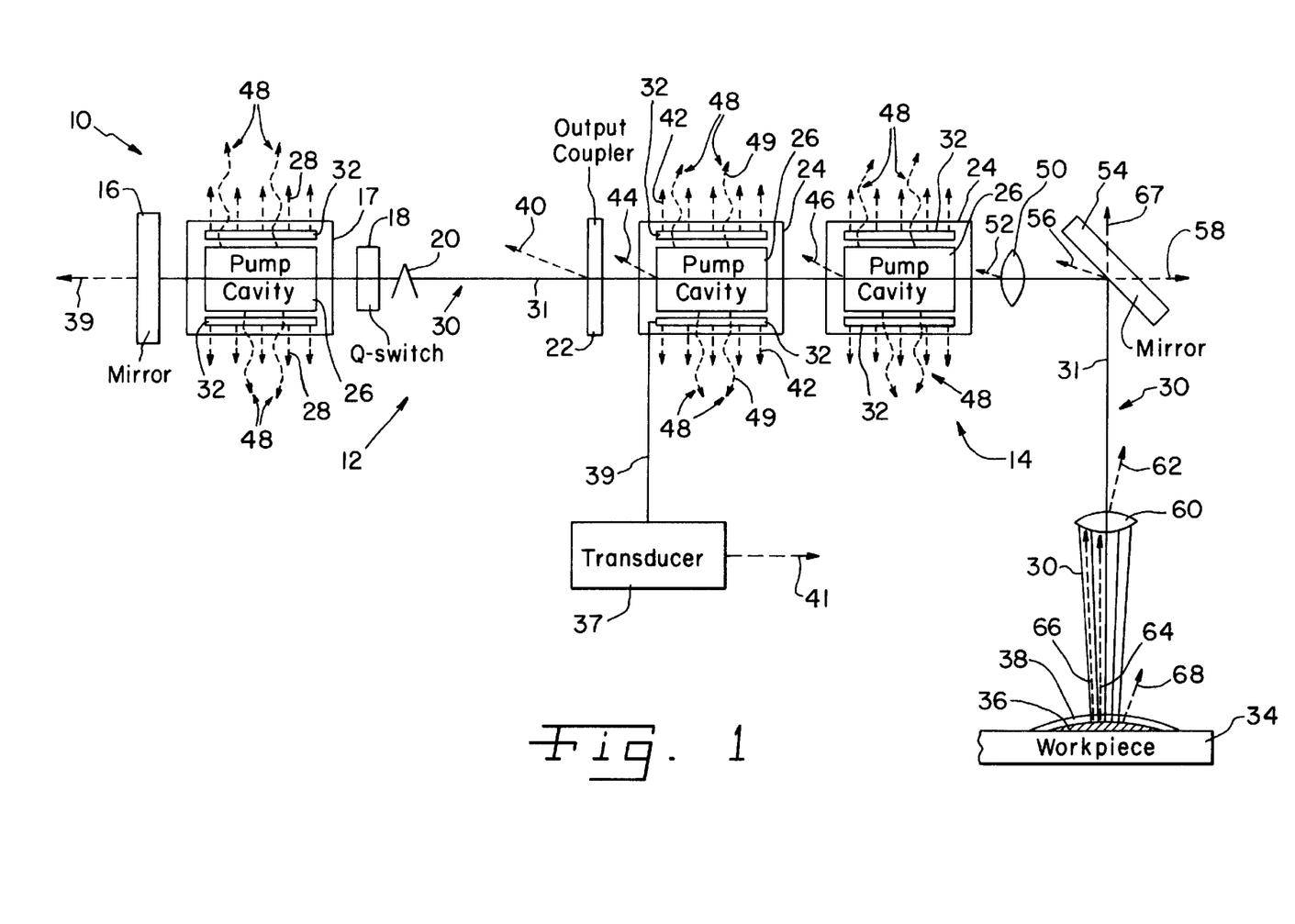
FIG. 1 is a diagrammatic view of a laser system incorporating the present invention.

Referring now to FIG. 1, laser 10 depicts one embodiment incorporating an optical monitor system of the present invention. Laser system 10 herein described, is to be demonstrative of the operation of the optical monitor. However, laser system 10 is not intended to limit the applicability of the optical monitor for employment in other applications where detection of optical signals is advantageous.

Laser 10 consists of oscillator 12 and amplifier 14. Oscillator 12 consists of high-reflectivity mirror 16, pump cavity 17, Q-switch 18, polarizer 20 and output coupler 22. Oscillator 12 and amplifier 14 include pump cavities 17, 24, respectively, having gain medium 26 through which laser beam 30 traverses. Laser beam 30 proceeds along a laser beam path having a laser beam axis 31. Gain medium 26 can be composed of any suitable material. For example, gain medium 26 could be composed of Neodymium in a phosphate-glass matrix and can be in the form of either a rod or a slab. Flashlamps 32 pump the upper laser level of the gain medium 26.

Laser 10 is optimized for use in laser shock processing. In laser shock processing, a workpiece 34 is processed by imparting deep compressive residual stresses therein. An energy absorbing layer 36 and a transparent layer 38 are typically applied to workpiece 34.

During laser shock processing, a beam of coherent energy 30 is directed along laser beam axis 31 from laser 10 to energy absorbing layer 36, which is quickly vaporized, forming a plasma. The plasma is substantially confined by transparent overlay 38 and creates a shockwave on the surface of workpiece 34 which, in turn, imparts deep compressive residual stresses in workpiece 34.

Typically optical components are positioned in the laser beam path slightly off of normal from the laser beam axis 31. This prevents direct reflection of laser energy back into the laser system. Components are typically positioned between zero degrees and seven degrees off of normal. The end faces of laser rods and slabs are typically at an angle to prevent parasitic oscillations within the laser gain media. These optical surfaces (rods and other transmissive optical components) provide a convenient source of optical signals to diagnose various aspects of the "health" or status of the laser system.

During the operation of laser 10, a beam of coherent energy 30 is generated within oscillator 12 by reflecting multiple times between the high-reflectivity mirror 16 and the output coupler 22. A small portion of the coherent energy is transmitted through the high-reflectivity mirror 16 of the oscillator cavity 12, producing optical signals 39. At the same time a small amount of energy is scattered and reflected from each of the optical surfaces in the oscillator cavity 12. Optical signal 40 represents an optical signal scattered from the output coupler 22.

Flashlamps 32, pump the gain medium 26 of pump cavity 17 with a broad spectrum of wavelengths. Each time flashlamp 32 fires, a flashlamp signal 28 is generated. As gain medium 26 is pumped by flashlamps 32, the gain medium 26 fluoresces to produce fluorescence signal 48.

Laser beam 30 is amplified by amplifier 14. Flashlamps 32 pump the gain medium 26 of amplifier 14 with a broad spectrum of wavelengths. Every time each flashlamp 32 fires, a flashlamp signal 42 is generated.

Current transducer 37 supplies energy via line 39 to flashlamps 32. Current transducer 37 generates an electrical signal which is then converted into optical signal 41. An LED or other capable device may be utilized to convert the electrical to an optical signal 41. Optical signal 41 is then able to be detected.

Gain medium signals 44, 46 are produced from the part of laser beam 30 which reflects or scatters off of the gain medium 26. Gain medium 26 produces fluorescence signal 48 when pumped by flashlamps 32. Fluorescence signal 48 radiates from gain medium 26 in all directions, including optical signal axis 49. A portion of this randomly directed signal 48 may be coaxial or non-coaxial to laser beam axis 31.

Lens 50 refracts laser beam 30 and produces lens signal 52 as a reflection off of lens 50. Mirror 54 redirects laser beam 30. Mirror reflection 56 and mirror transmittance 58 are generated by reflecting off of or transmitting through mirror 54 respectively. Both optical signals of mirror reflection 56 and mirror transmittance 58 may be monitored. Mirror reflection 56 is an optical signal produced by laser beam 30 being scattered out of the laser beam path, laser beam axis 31.

Lens 60 is an example of a transmissive optical component which focuses laser beam 30 to workpiece 34. Optical component reflection 62 is produced by a reflection of a portion of laser beam 30 from the surface of lens 60.

Backscatter signal 64, 66 is produced by a target backscattering event. A target backscattering event occurs if laser beam 30 reflects off of transparent overlay 38 or workpiece 34 and then propagates back into the laser 10. Backscatter signal 64 is produced by laser beam 30 reflecting off of transparent overlay 38. Backscatter signal 66 is produced by laser beam 30 reflecting or scattering off of workpiece 34.

A target backscattering event results in energy being directed back into the laser system 10. The energy directed is in the form of photons which are typically scattered in all directions. Some photons produced by the backscattering event will traverse along laser beam axis 31 in the opposite direction of a pulse of laser energy 30. These backscattering event photons traverse along laser beam axis 31 and are focused and redirected by the various optical components along the laser path. When the target backscattering event photons reach amplifier 24, amplifier 24 amplifies these target backscattering event photons. It is advantageous to detect a backscattering event which produces photons traversing along the laser beam axis 31, but in the opposite direction of laser beam 30 to prevent these photons from being amplified and possibly damaging optical components in the laser system 10.

The backscattering photons may be detected as an optical signal, such as mirror transmittance 67. A majority of the photons produced by the target backscattering event will be reflected by mirror 54 and proceed onto pump cavity 24. However, some photons "leak" through mirror 54 to produce mirror transmittance 67. The presence of mirror transmittance 67 is indicative of a target backscattering event.

Plasma optical signal 68 is generated by the plasma formed on the surface of workpiece 34 during laser shock processing. Plasma optical signal 68 has a wavelength which corresponds to properties of the plasma, such as plasma constituents and plasma temperature. A filter could be used to select a specific wavelength for detecting various physical characteristics or properties of the plasma one wishes to monitor. For example, a plurality of filters, each one filtering at a specific wavelength, can be used to monitor different plasma characteristics.

Figure 2A:
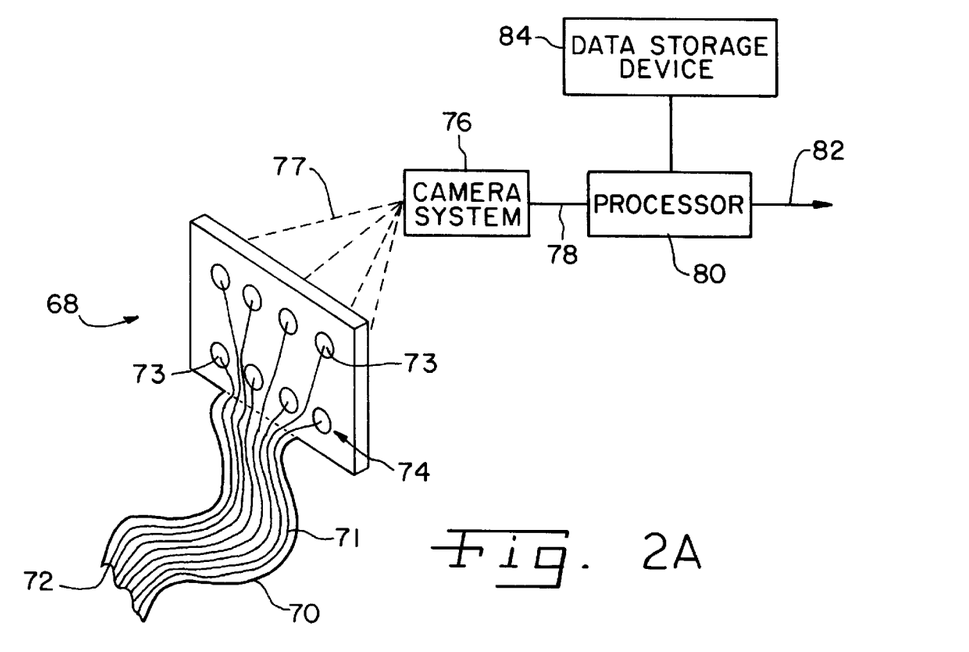
FIG. 2(a) is a diagrammatic view of an optical monitor system having an optical signal array and image processing system as viewed in the direction of a fiber optic array input.
Figure 2B:
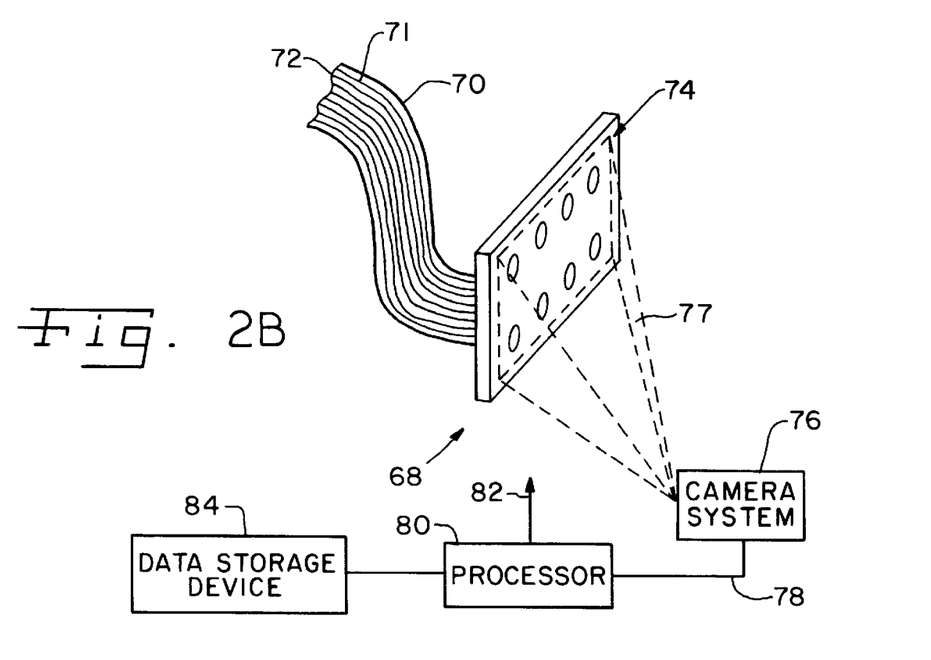
FIG. 2(b) is the same optical signal array and image processing system as FIG. 2(a) viewed from the perspective of the image capturing system.

Fiber optics are used for communicating the various optical signals to the processor. FIGS. 2a and 2b are illustrative of one monitor system 68 for monitoring a plurality of optical signals. A plurality of monitor systems 68 may be employed for monitoring various optical signal systems. The various optical systems monitored include those described above, such as, but not limited to, optical signals 40, 52, 56, and 62 generated from various components, flashlamp signals 42, gain medium signals 44, 46, and fluorescence signals 48.

Fiber optics 70 consists of, for example, eight individual fibers 71. Each of the eight fibers 71 has a first end 72. Each first end 72 corresponds to the origin of fiber 71, which is in optical communication with a different optical signal. For example, each fiber 71 may be associated with a separate lens signal, mirror reflection signal, or other optical signal generator. Fibers 71 have a second end 73, which corresponds to the termination of fiber 71. The second end 73 forms optical array 74.

Optical array 74 provides a number of optical signals. A plurality of collecting lens (not shown), one for each optical signal, focuses and directs the respective optical signal into a respective fiber 71. A collecting lens may not be required for some optical signals, depending upon the amount of energy that is required by the camera system 76 or other detector array. During operation of monitor 68, a plurality of optical signals are communicated from a plurality of optical signal generators, through fiber optics 70 to optical array 74.

Camera system 76 captures an image of array 74, array image 77. Camera system 76 digitizes array image 77 and generates an array signal 78. Array signal 78 is communicated to processor 80.

Processor 80 runs image processing software for analyzing array signal 78. Through the image processing software, processor 80 detects the presence, level, and/or absence of one or more of the optical signals comprising array 74.

Figure 5A:
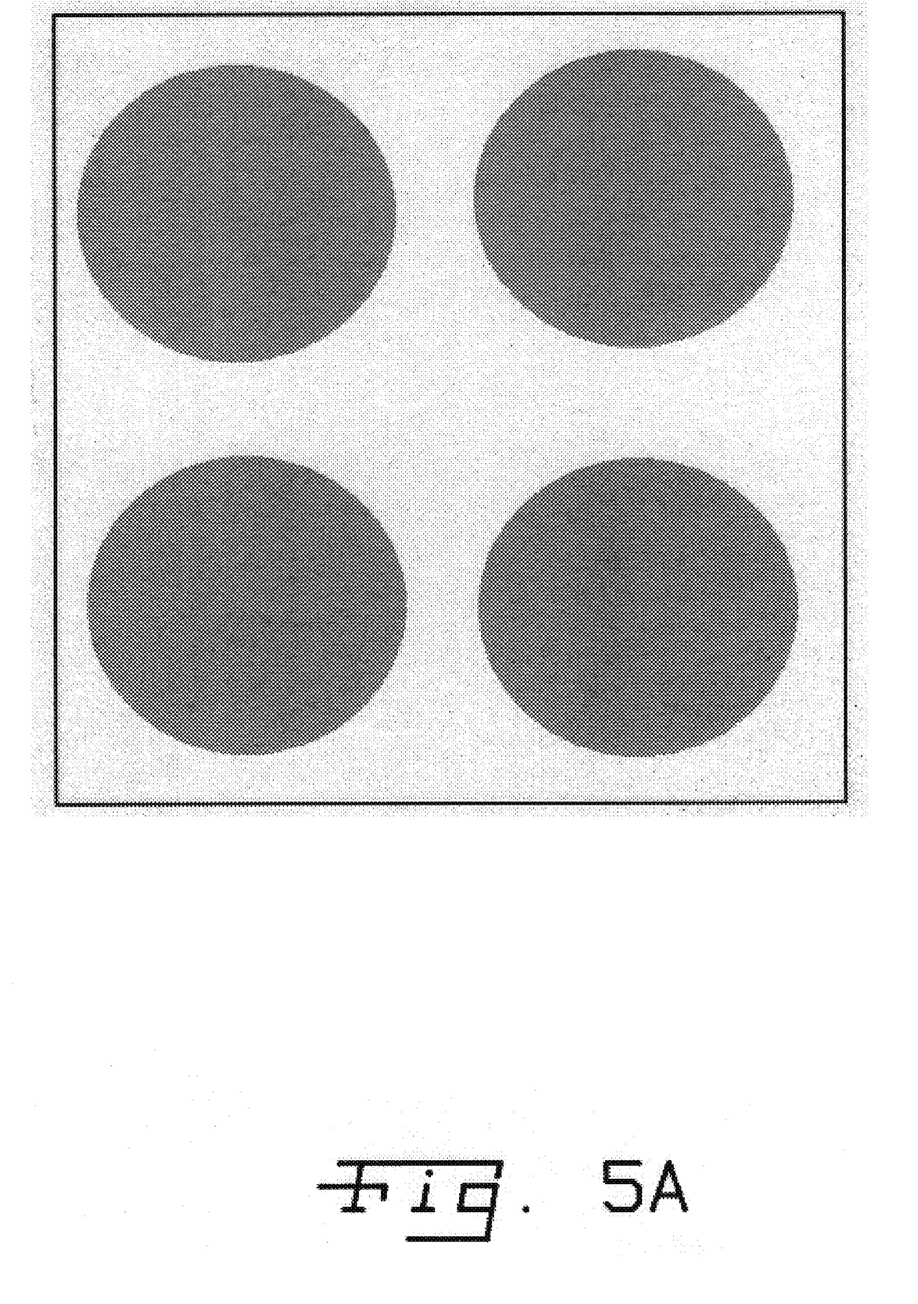
FIG. 5a through FIG. 5d depict various arrays of optical signals according to the present invention.
Figure 5B:
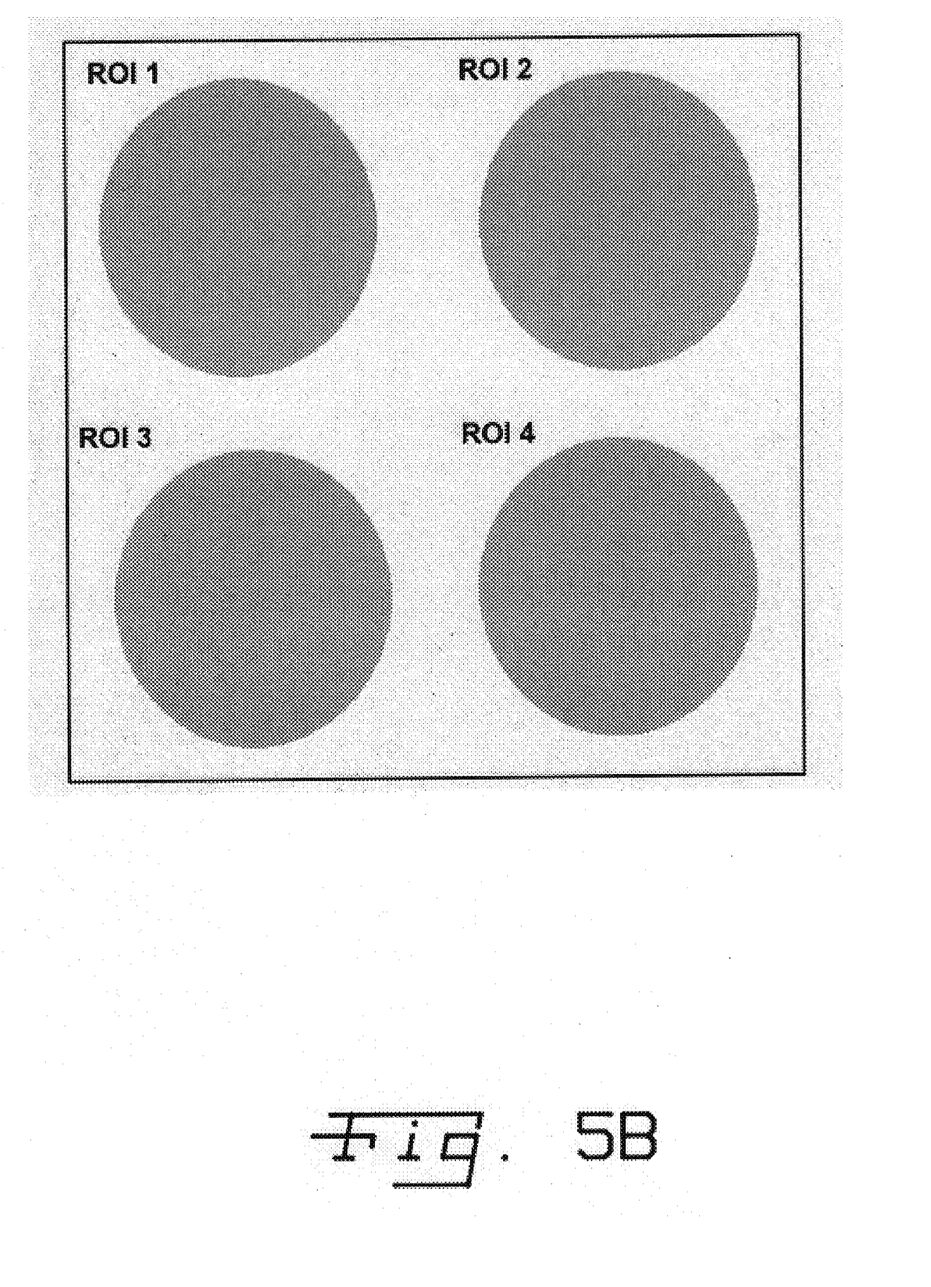

FIGS. 5a through 5d are illustrative of image processing of an array of optical signals. Referring now to FIG. 5a, the array image 77 is converted from an analog to a digital signal by camera system 76 to produce array signal 78. Array signal 78 is divided into specific regions of interest (ROI). FIG. 5b depicts four such regions of interest labeled ROI1 through ROI4.

Each of the regions of interest (ROI) is mathematically manipulated to determine the health or status of the laser system or the level of compliance with laser system operation parameters or processing specifications and parameters for effective laser shock processing. For example, manipulations typically used in image processing include centroid, average pixel intensity, and pixel summing.

Figure 5C:
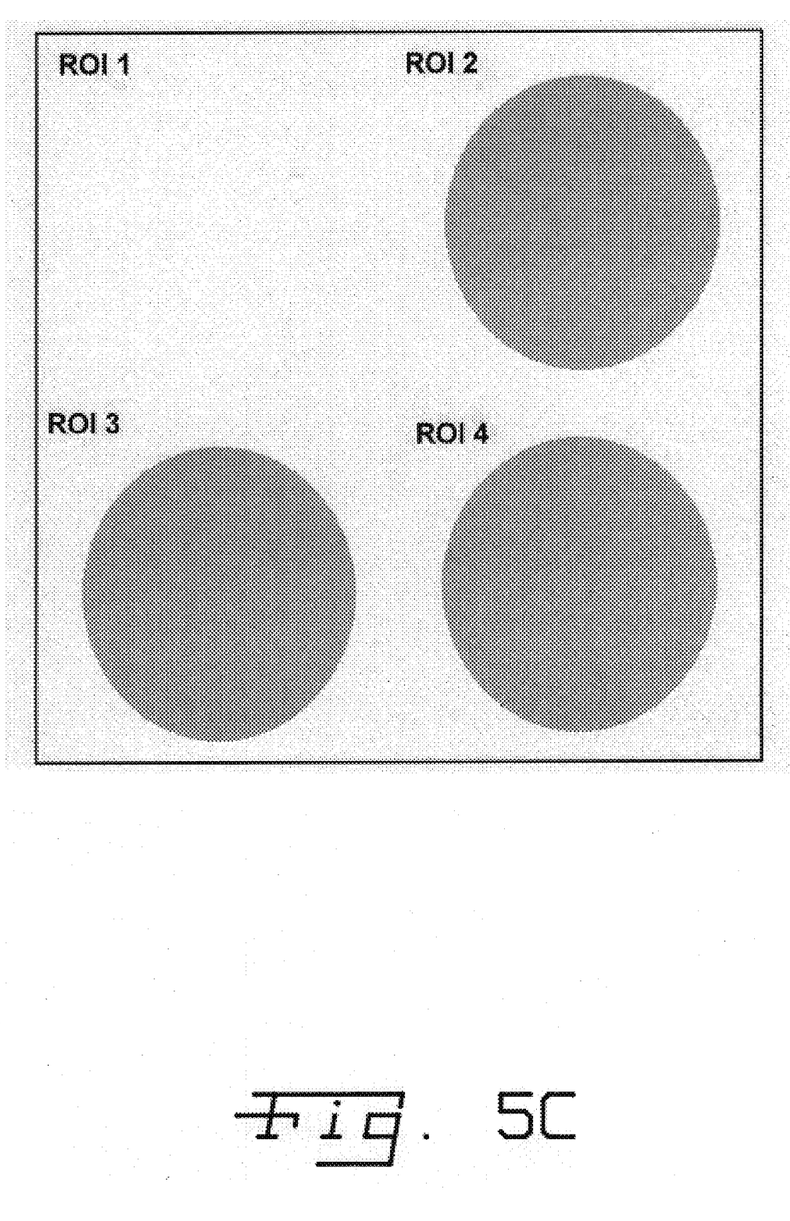
Figure 5D:
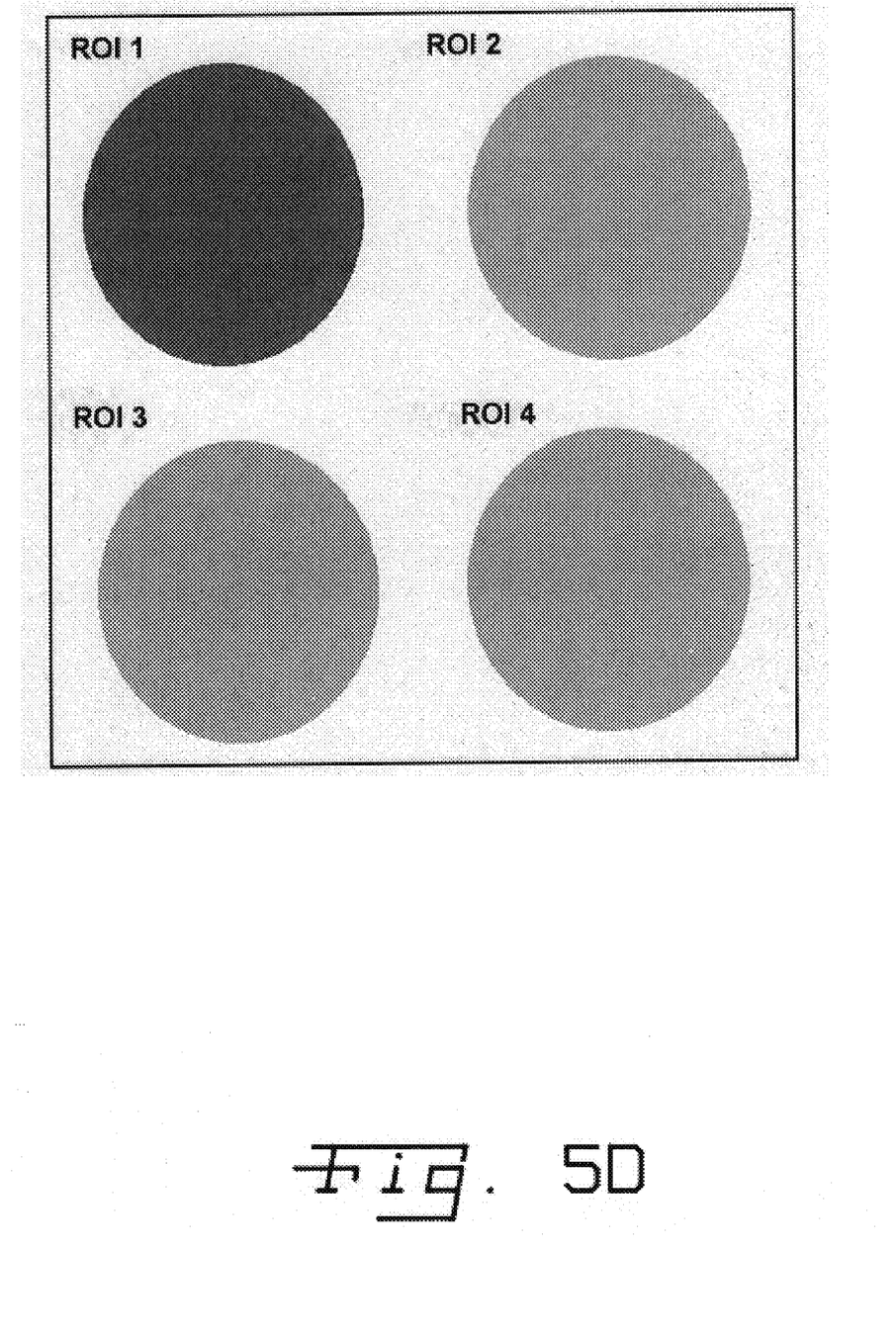

Referring now to FIG. 5c, ROI1 is missing. The aforementioned image processing manipulations would identify both a change in the average pixel intensity and pixel sum in ROI1, as depicted in FIG. 5c compared with ROI1 depicted in FIG. 5b.

Image processing of the various regions of interest may be used to detect an optical signal less intense than the other regions-of-interest optical signals. For example FIG. 5d, ROI1, is less intense than ROI2–ROI4. The average pixel intensity and pixel sums of ROI1 can be compared with the other regions of interest in this array of images (i.e. regions of interest 2–4).

Alternatively, or in addition, the image processing may compare the ROI image digitized and manipulated during a previous event with a current event. Processor 80 may contain memory means for storing images, digitized data, or other operating conditions. In addition, processor 80 may maintain a database of image processed regions of interest. Processor 80 can then compare an ROI currently being processed with the same ROI previously processed.

Processor 80 then generates a processor signal 82 which corresponds to a quality of the optical signals comprising array 74. For example, processor 80 may detect a quality of the optical signal corresponding to the signal's absence or presence. Then processor 80 may generate a processor signal 82 indicating the detected absence or presence of the optical signal.

The various optical signals may be further processed by processor 80 to monitor other qualities of the various optical signals. For example, array signal 78 can be processed for determining the intensity and the wavelength of the individual optical signals which comprise array 74. Data storage device 84 records data pertaining to the detected optical signals.

Processor 80 may alert an operator of the absence or presence of an individual optical signal. In addition, processor 80 may alert an operator if the intensity or wavelength of the optical signal if the optical signal is not within operating parameters. The absence, presence, intensity, and wavelength of an optical signal may indicate the status of various laser components which generate the optical signal.

Processor 80 may also provide feedback control over various laser components in order to adjust the components so that the optical signal is within operating parameters. If processor 80 detects an optical signal having a value which is not within operating parameters, processor 80 could adjust one or more of the laser parameters responsible for generating the optical signal until the optical signal is within operating parameters.

In addition, a SMART CONTROLLER may be utilized as processor 80 to monitor and control various optical signals and the respective optical signal generator. The SMART CONTROLLER is disclosed in co-pending U.S. Patent Application, Attorney docket number LSP-17, which is herein incorporated by eference.

The optical signal detected may correspond to the fluorescence amplitude of the gain medium. If the fluorescence amplitude is outside of operating parameters, processor 80 can adjust pumping energy of the flashlamps 32 (FIG. 1) so that the optical signal (i.e. the fluorescence amplitude) generated is within operating parameters.

A second example would be if the optical signal were flashlamp signal 42 and processor 80 determines that the intensity is not within operating parameters. Processor 80 could adjust the current to flashlamp 32 whereby the intensity of flashlamp signal 42 would be adjusted until the flashlamp signal 42 is within operating parameters.

A third example would be if the optical signal corresponding to the laser beam energy at some location within the laser system moved outside of normal operating parameters, processor 80 could adjust the pump intensity of the flashlamps (typically by adjusting the pump voltage) or preferably by adjusting timing of the flashlamps. Adjusting the flashlamp timing moves the laser pulse around on the fluorescence curve, which effectively adjusts the level of pump energy available to be extracted by the laser pulse as it passes through amplifier 14.

In an alternate embodiment of the present invention (FIG. 3), a plurality of photodiodes 86, one per fiber 72, are used for detecting the presence of an optical signal rather than imaging array 74 with a camera. The plurality of photodiodes 86 generate photodiode signal 88 which corresponds to an optical signal carried by fiber optics 70. Photodiode signal is analyzed by processor 80. Processor 80 determines the presence or absence of an optical signal. Processor 80 may also determine the intensity or wavelength of various optical signals.

Figure 3:
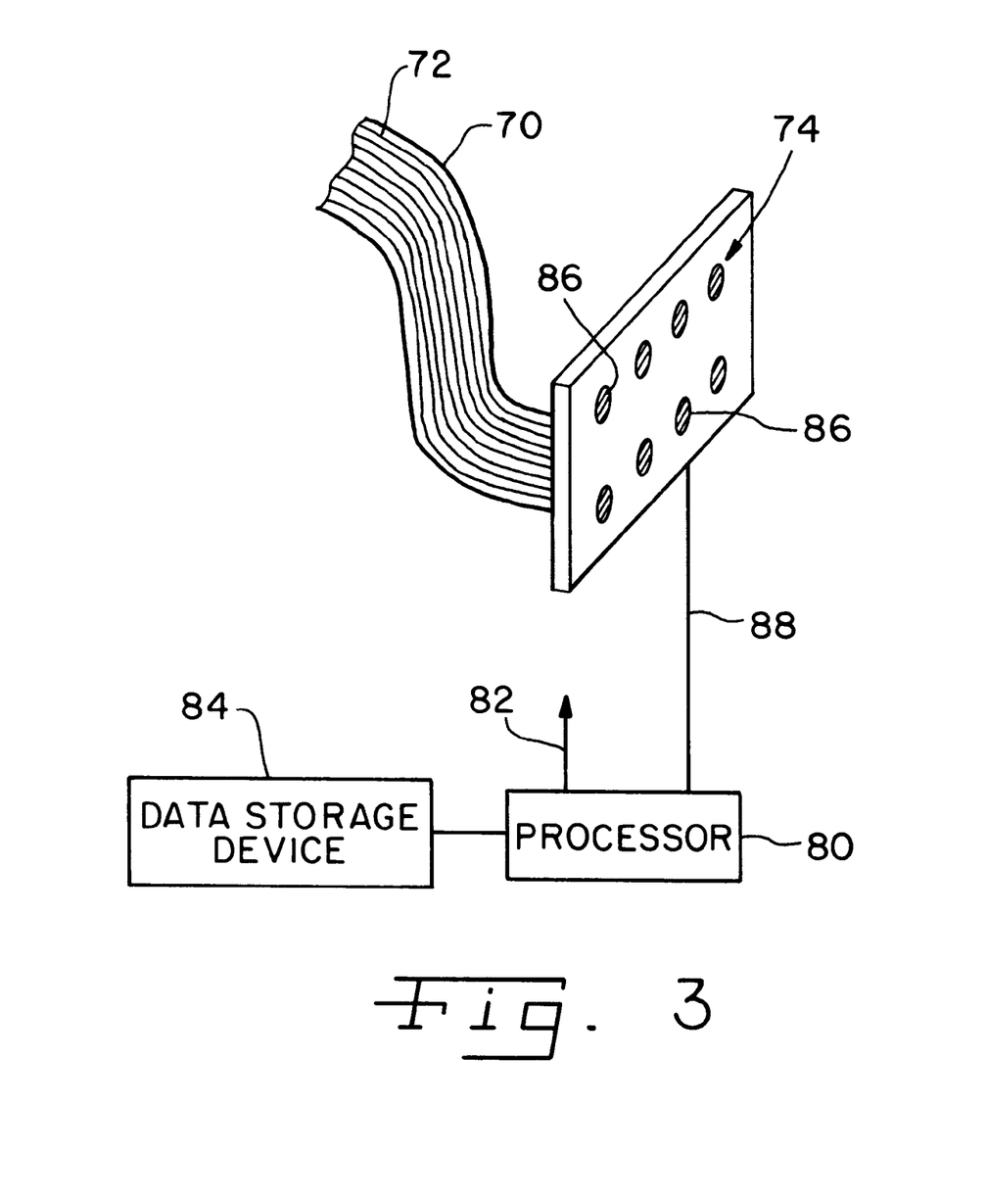
FIG. 3 is a diagrammatic view of a photodiode optical signal detector.

It is preferable to use a commercially packaged array of photodiodes. Available in the art are linear arrays or a matrix of photodiodes (for example 2×20 of photodiodes). The output ends of the fiber optics can be arranged to form an array. This array of fiber outputs can be imaged onto an array of photodiodes using a single collecting lens (not shown) located between the fiber optic end and the input end of the array of photodiodes. The advantage of using a single collecting lens to focus the outputs of a fiber optic to the array of photodiodes is a decrease in complexity as compared with a system employing an array of single lenses or a lenslette array. Alternatively, the optical signals from the fiber optic array can be imaged onto the photodiode array such that each fiber hits one or multiple diodes for processing.

Figure 4:
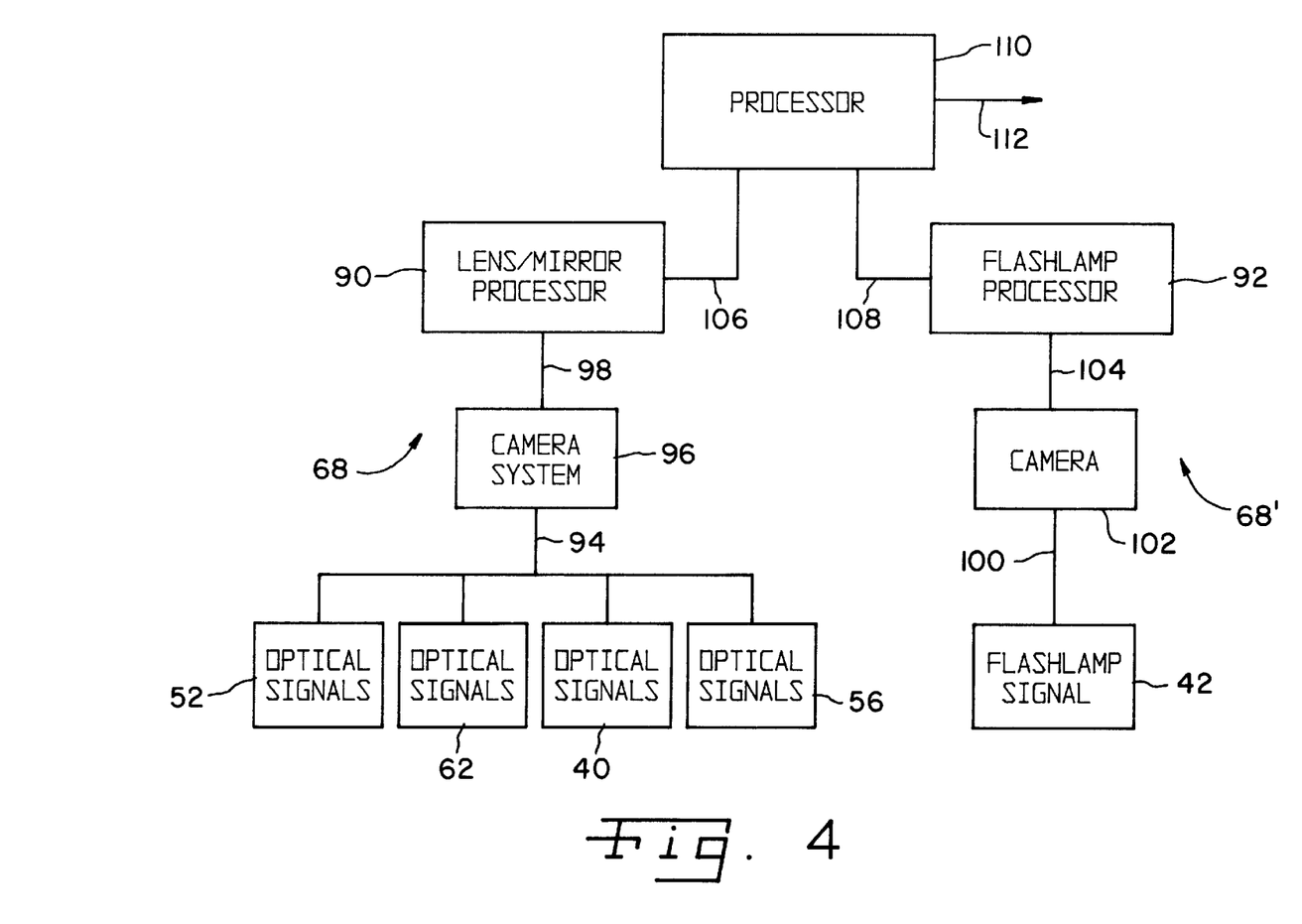
FIG. 4 is a diagrammatic view depicting distributed processor means and central processor according to the present invention.

Referring now to FIG. 4, a further embodiment of the present invention utilizes a plurality of monitor systems 68, 68'. Each monitor system 68, 68' monitors an optical system or signal. For example, lens/mirror processor 90 may process optical signals from lens reflecting signals 52, 62 and mirror signals reflection 40, 56. Flashlamp processor 92 may monitor flashlamp signals 42.

Fiber optics 94 act as a conduit for delivering lens reflecting signals 52, 62 and mirror reflection signals 40, 56 respectively to an array which camera system 96 digitizes. Camera system 96 produces a lens and mirror array signal 98 which lens/mirror processor 90 processes.

Fiber optics 100 carries flashlamp signals 42 to a flashlamp array (not shown) which is imaged by camera 102 and a flashlamp array signal 104 is processed by flashlamp processor 92. Lens/mirror processor 90 generates lens/mirror processor signal 106 and flashlamp processor 92 generates flashlamp processor signal 108. Processor signals 106, 108 are processed by central processor 110.

Central processor 110 analyzes processor signals 106, 108 and generates a central processor signal 112 when central processor 110 determines processor signals 106, 108, individually or taken together are not within operating parameters. Alternatively, processor 110 may generate central processor signal 112 to alert an operator of the status of various optics and optical generating components as a function of optical signal presence, absence, intensity, wavelength, or other quality. Central processor 110 may have associated with it a recording device (not shown) for recording data pertaining to the various detected optical signals.

While FIG. 4 depicts distributed processing between two monitor systems 68, 68', additional monitor systems may feed into or be associated with central processor 110.

The present invention may be used to monitor the status of a laser system 10 as depicted in FIG. 1. In addition, the present invention may be used to monitor any optical signal and/or generator of optical signals.

The present invention may also be used to detect the degradation of optical coatings. Deterioration of optical coatings may be detected using the present invention. When the optical coatings degrade, there is an increase in scattering of the laser beam from the laser beam path. An increase in scattering of the laser beam results in an increase in the scattered light optical signal. A fiber optic with collecting lens can focus the scattered-light optical signal to a fiber optic for processing. In some systems a lens may not be required to collect the scattered light.

An increase in the detected scattered light is an indication that an optic has suffered degradation. Fiber optics can be located near various optics such as lenses and mirrors where light may be scattered from the laser beam path. When the processor determines there is an increase in intensity or the presence of a scattered light optical signal, the monitor could indicate to an operator that the various components' optical coating has degraded.

The present invention may also be used to monitor amplified spontaneous emission events. Spontaneous emission occurs naturally when the gain medium is energized. The presence of amplified spontaneous emission may indicate that the gain medium is not energized to a level suitable for use. Amplified spontaneous emission removes energy from the gain medium. Amplified spontaneous emission traverses along laser beam axis 31 and has the same wavelength as laser beam 30 (FIG. 1). In addition, amplified spontaneous emission travels both toward the workpiece and toward the oscillator.

The amplified spontaneous emission can be detected as the presence of light where and when light is not expected to be located. Amplified spontaneous emission can be detected as laser light traveling in the wrong direction, i.e. away from the workpiece and toward the oscillator. A fiber optic can be located upstream and downstream of the gain medium. If the processor detects the presence of an optical signal upstream or downstream of the gain medium, where no optical signal should be present, the processor may indicate the occurrence of amplified spontaneous emission. The processor can alert the operator and log the possible occurrence of amplified spontaneous emission.

The status of a laser system may further be monitored by the present invention by measuring the amount of energy in laser beam 30 at different points along the laser beam path. For example, the amount of energy entering each of the individual amplifiers' pump cavities 24 may be monitored. At each stage, the processor can analyze the gain medium signal 44, 46. The intensity of the gain medium signals 44, 46, is coordinated to the intensity of the laser beam 30. In the embodiment depicted in FIG. 1 and described herein, a percentage of laser beam 30 is reflected out of the laser beam path. Therefore, one can correlate the reflected energy of gain medium signal 44, 46 to the energy of laser beam 30.

Further, the present invention may be used to monitor for consistent energy of the laser beam 30 throughout the laser system 10. In addition, the processor may contain feedback to control the current and/or voltage to flashlamps 32 to affect the pumping of the gain medium 26, which in turn adjusts the energy of laser beam 30 so as to achieve a consistent laser energy level along the laser beam path 31.

The plurality of optical signals may be correlated to the energy present within the laser system 10. The processor can manipulate the plurality of optical signals received from the various optical generators and correlate the manipulated optical signal data to an energy value. As a result, the present invention could be employed to monitor the energy levels at numerous components or along the laser beam path from the oscillator through the amplifier and onto the workpiece. Consequently, the present invention may be used to monitor energy levels all along the laser beam path.

The present invention may be used as a fluorescence detector to actively monitor the aging of flashlamps. A decrease in fluorescence signal 48 may indicate that the flashlamps are aging. Alternatively, a decrease in fluorescence signal 48 may indicate that the reflective coating of pump cavity 24 is aging or that coolant is removing pump energy. If pump energy is removed from pump cavity 24, the energy is not available to be supplied to the laser beam. Feedback can be used to adjust the pumping of the gain medium 26 such that the fluorescence signal 48 is within operating parameters. In addition, the presence of fluorescence signal 48 indicates that the flashlamps 42 are firing and properly energizing the gain medium 26.

The age of the flashlamps may also be monitored by the present invention, as a change in wavelength of flashlamp optical signal. As the flashlamps age, the light (i.e. spectrum) emitted shifts towards the ultraviolet portion of the spectrum. The result may be realized as an increase in the intensity of shorter wavelengths. An increase in intensity of shorter wavelengths coupled with a decrease of fluorescence emission from the gain medium could indicate flashlamp degradation.

The present invention may be used to monitor the intensity of the flashlamps flashing. One of the plurality of optical signals can correspond to a flashlamp signal. This flashlamp signal can be processed by the processor and a flashlamp intensity signal generated through optical signal image processing. Active feedback between the processor and the flashlamps may be utilized for adjusting the intensity of the flashlamp so as to make the flashlamp intensity optical signal within operating parameters.

In addition, the flashlamp timing can be adjusted in order for the laser energy at a point along the beam path to be within operating parameters. The flashlamp timing is the temporal relationship between the laser pulse and the flashlamp pump pulse. If the processor determines that the laser energy is not within operating parameters, the processor can adjust the flashlamp timing accordingly. For example, adjusting the flashlamp timing will adjust the energy in laser beam 30.

The use of fiber optics eliminates interference to signal propagation due to electromagnetic interference (EMI). With pulsed lasers such as those use for laser peening, EMI is an effect of operation. During flashlamp discharge, EMI can produce noise in electrical wire, such as copper wire. By using fiber optics, the potential of EMI in signal acquisition and propagation by electrical wire is eliminated.

The present invention may use data tracking for monitoring the life and operation of the laser system 10. The data can be used to estimate the remaining life of various optical components. In addition, the data recorded could be used for scheduling maintenance or for evaluating the performance of laser system 10.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for monitoring a plurality of optical signals, comprising:

at least one optical signal generator, each of said at least one optical signal generator producing at least one of the plurality of optical signals;

fiber optics having at least two fibers, each of said at least two fibers having a first end and a second end, said first end operatively associated with one signal of the plurality of optical signals, and said second end terminating at an array;

optical sensor means operatively associated with said array for generating an array signal; and processor means operatively associated with said array signal for detecting a quality of the plurality of optical signals.

2. The apparatus according to claim 1 wherein said at least one optical signal generator is a mirror reflection off of a mirror.

3. The apparatus according to claim 1 wherein said at least one optical signal generator is an optical component reflection off of a transmissive optical component.

4. The apparatus according to claim 1 wherein said at least one optical signal generator comprises a plurality of optical component reflections off of a plurality of transmissive optical components, respectively.

5. The apparatus according to claim 1 wherein said at least one optical signal generator comprises a plurality of mirror reflections off of a plurality of mirrors, respectively.

6. The apparatus according to claim 1 further comprising:
gain medium; and
said at least one optical signal generator is amplified spontaneous emission from said gain medium.

7. The apparatus according to claim 1 wherein said at least one optical signal generator is a target backscattering event.

8. The apparatus according to claim 1 wherein said at least one optical signal generator is a gain medium reflection off a gain medium.

9. The apparatus according to claim 1 wherein said processor means generates a processor signal corresponding to one of a presence or an absence of at least one of the plurality of optical signals.

10. The apparatus according to claim 1, wherein said quality of at least one of the plurality of optical signals is presence of the optical signal.

11. The apparatus according to claim 1, wherein said quality of at least one of the plurality of optical signals is intensity.

12. The apparatus according to claim 1, wherein said quality of at least one of the plurality of optical signals is wavelength.

13. The apparatus according to claim 1, further comprising a data storage device for recording data pertaining to at least one of the plurality of optical signals.

14. The apparatus according to claim 1 wherein said optical sensor means comprises a camera.

15. The apparatus according to claim 1 wherein said optical sensor means comprises a photodiode operatively associated with each said fiber.

16. The apparatus according to claim 1, further comprising:
said processor generating a first processor signal;
a second fiber optics;
a second optical sensor means;
a second processor means, said second processor means generating a second processor signal;
a central processor operatively associated with said first processor signal and said second processor signal, said central processor generating a central processor signal.

17. The apparatus according to claim 1 wherein said processor means further correlates said at least one of the plurality of optical signal to an energy value.

18. The apparatus of claim 1 wherein said at least one optical signal generator is a mirror transmittance optical signal.

19. The apparatus according to claim 1 wherein said at least one optical signal generator comprises a plurality of mirror reflections off of a plurality of mirrors, respectively; and a plurality of optical component reflections off of a plurality of transmissive optical components, respectively.

20. The apparatus according to claim 19 wherein said processor means generates a processor signal corresponding to one of said presence or an absence of at least one of the plurality of optical signals.

21. The apparatus according to claim 1 wherein said at least one optical signal generator is fluorescence from a gain medium.

22. The apparatus according to claim 21 further comprising:
a laser beam axis; and
the plurality of optical signals proceeding along an optical signal axis, said laser beam axis and said optical signal axis being non-coaxial.

23. The apparatus according to claim 1 wherein said at least one optical signal generator is a flashlamp.

24. The apparatus according to claim 23 wherein said processor means generates a processor signal corresponding to one of said presence or an absence of at least one of the plurality of optical signals.

25. The apparatus according to claim 23 further comprising:
said flashlamp having a flashlamp intensity;
said quality of at least one of the plurality of optical signals is a flashlamp intensity signal; and
said flashlamp intensity signal is operatively associated with said flashlamp for adjusting said flashlamp intensity.

26. The apparatus according to claim 23 further comprising:
said flashlamp having a flashlamp timing;
said quality of at least one of the plurality of optical signals is a laser beam energy signal; and
said laser beam energy signal is operatively associated with said flashlamp for adjusting said flashlamp timing.

27. A method of monitoring a plurality of optical signals, comprising the steps:
providing fiber optics having an origin operatively associated with an optical signal generator and a termination forming an array;
producing a plurality of optical signals with said optical signal generator;
capturing the plurality of optical signals from the array to generate at least one captured signal; and
detecting a quality of at least one of the plurality of optical signals from the at least one captured signal.

28. The method according to claim 27 wherein the step of capturing the plurality of optical signals is performed by a camera.

29. The method according to claim 27 wherein the step of capturing the plurality of optical signals is performed by a photodiode array.

30. The method according to claim 27 wherein the quality of at least one of the plurality of optical signals is a presence of the optical signal.

31. The method according to claim 27 wherein the quality of at least one of the plurality of optical signals is intensity.

32. The method according to claim 27 wherein the quality of at least one of the plurality of optical signals is wavelength.

33. The method according to claim 27 further comprising the step of generating a processor signal corresponding to the detected quality of at least one captured signal.

34. The method according to claim 33 further comprising the step of adjusting a generator which generates at least one of the plurality of optical signals in response to the processor signal.

35. The method of claim 34 wherein the generator is a component of a laser system.

36. The method according to claim 27 wherein the optical signal is generated from components of a laser.

37. The method according to claim 36 wherein the laser is used in laser shock processing.

38. The method according to claim 36 wherein said components comprise a light-emitting device.

39. The method according to claim 38 wherein said light-emitting device is an electronic device.

* * * * *